Figure 1:
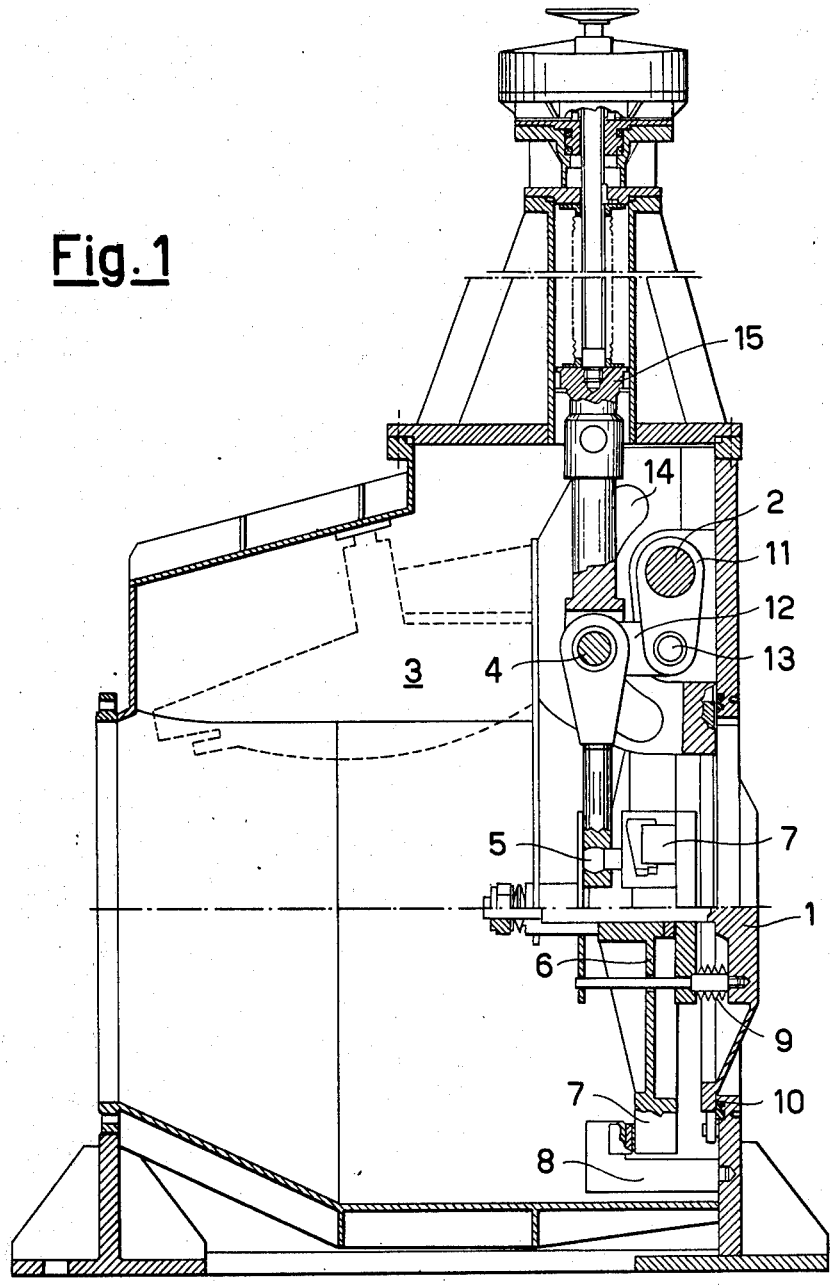

United States Patent [19]

Di Sciascio et al.

[11] 4,071,221
[45] Jan. 31, 1978

[54] ISOLATION VALVE AFFORDING AN ABSOLUTE TIGHTNESS TOWARDS THE EXTERIOR AND BETWEEN THE SEAT AND THE SHUTTING MEMBER

[75] Inventors: Nicola Di Sciascio; Michele Vinci, both of Bari, Italy

[73] Assignee: Nuovo Pignone S.p.A., Italy

[21] Appl. No.: 694,355

[22] Filed: June 9, 1976

[30] Foreign Application Priority Data

June 10, 1975 Italy ................................ 24190/75

[51] Int. Cl.² ............................................. F16K 31/44
[52] U.S. Cl. .................................... 251/228; 251/85; 251/158; 251/187; 251/298
[58] Field of Search ................ 251/158, 187, 228, 85, 251/298

[56] References Cited

U.S. PATENT DOCUMENTS

| 2,535,525 | 12/1950 | Wolfe | 251/228 |
| 2,809,010 | 10/1957 | Ipsen et al. | 251/228 |
| 3,119,594 | 1/1964 | Heggem | 251/228 |
| 3,254,660 | 6/1966 | Ray | 251/228 |
| 3,727,880 | 4/1973 | Stock | 251/85 |

FOREIGN PATENT DOCUMENTS

| 1,290,219 | 2/1961 | France | 251/187 |
| 505,300 | 5/1939 | United Kingdom | 251/187 |

*Primary Examiner*—William R. Cline
*Assistant Examiner*—H. Jay Spiegel
*Attorney, Agent, or Firm*—Morgan, Finnegan, Pine, Foley & Lee

[57] ABSTRACT

An absolutely tight valve is disclosed, especially suitable for nuclear installations where safety is of paramount importance. The valve provides a tight seal by means of a wheel having a set of projecting spokes, the wheel being placed over the shutter disk and integral therewith. Inclines integral with the valve body cooperate with the spoke ends in a wedging engagement, and a set of cup springs discharge the reactive forces and secure a tight seal.

3 Claims, 2 Drawing Figures

ISOLATION VALVE AFFORDING AN ABSOLUTE TIGHTNESS TOWARDS THE EXTERIOR AND BETWEEN THE SEAT AND THE SHUTTING MEMBER

The subject-matter of the present invention is an isolation valve having an absolute tightness both towards the exterior and between the valve seat and the shutting member.

This kind of valve finds an elective use for uranium enrichment installation and for gaseous diffusion, in which the tightness must be absolute for self-explanatory safety reasons.

Up to the present times, such a tightness had been achieved either by a twin-shutter gate valve such as in the French Pat. Specification No. 1,492,082 as used by the Firm Malbranque Serseg, or by butterfly valves equipped with a soft gasket between the shutting member and the seat.

With the former approach, limits had to be posed upon the valve size, because efficient tightness could be obtained for average-size valves but not with the larger size valves.

In addition, the tightness system was more expensive in that the tightness had to be double.

With the second approach, in addition to having a diminished efficiency in tightness, the constancy of the tight seal could not be warranted because in time the sealing gasket was subjected to wear during use.

The valve the subject of the present invention is characterized by its tightness system which, in addition to being both less bulky and cheaper than the conventional mechanisms, affords other considerable advantages. For example, a tight seal is provided towards the exterior and between the seat and the shutting member as well, which, when measured at the mass spectrometer, is in the order of $10^{-3} - 10^{-4}$ lusecs (1 lusec is a leak of 1 liter per second of helium under a pressure differential of 0.001 Torr). The tightness is referred to a valve having a large diameter which could attain three meters, whereas it is better for valves having a small or average diameter (from 400 to 1,000 millimeters).

Figure 2:
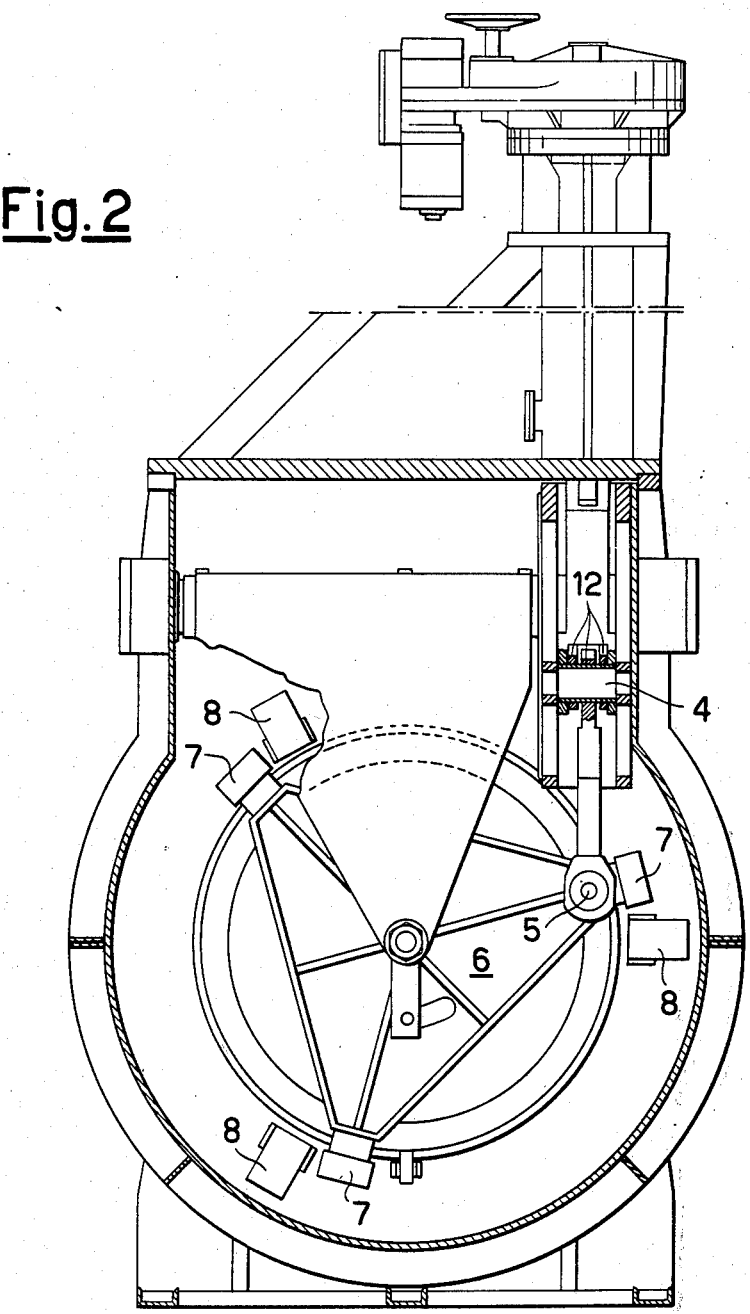

The valve and the tightness system which characterizes it are shown in FIGS. 1 and 2 to which reference will be had for the disclosure.

The absolute tightness of the shutter disk is obtained by means of a wheel having projecting spokes, arranged over the disk and integral therewith. When the disk is closed and rests against its seat, the spoked wheel is caused to be rotated about its own vertical axis and the ends of the projecting spokes are wedged under sloping planes which are integral with the valve body. By so doing, the wheel is depressed and urges cup springs which are placed on the shutter disk. These springs discharge the reactive force onto the shutter disk and thus also onto the sealing gasket.

The reverse movements are carried out for opening the disk, namely, first the wheel is rotated to disengage the spoke ends from the sloping planes and then the disk is rotated about its horizontal axis.

The disk-closing movement and the subsequent motion for rotating the protecting-spoke wheel or the reverse movement for opening the shutter disk are obtained with a single servo-motor which acts upon a mechanism to be described hereinafter, which permits to carry out, with a single translational movement, two rotations about axes which are perpendicular to each other.

The valve body is so constructed as to experience low pressure drops when the shutter is fully open and so as to enable the movable component parts easily to be withdrawn during the usual upkeep runs without removing the valve from its pipeline.

FIG. 1 shows a longitudinal cross-sectional view of the valve equipped with an electric servo-motor. The shutter 1 for the valve is rotated about a shaft 2 and is brought, when fully open, to the position 3 shown in dotted lines.

FIG. 2 shows a cross-sectional view of the valve with the shutter in the closed position but not yet of absolute tightness between the upstream and the downstream sections.

As a matter of fact, the latter condition is fulfilled by depressing the connecting rod small end 4 and thus the pin 5 still farther. The pin is integral with a projecting-spoke wheel 6 which, by being rotated about its axis, brings the ends of the spokes 7 to become wedged under the sloping planes 8 which are integral with the valve body. The slope of the inclines causes the spoked wheel to be advanced to compress sets of cup springs 9 which discharge the reactive forces onto the shutter 1 and thus on the sealing gasket 10.

By so doing, with a comparatively small force as exerted by the servo-motor, a large force becomes available on the shutter and thus a satisfactory tightness is achieved.

To open the valve, the servo-motor drags the connecting rod small end 4 upwards until clearing the ends of the spokes 7 from the inclines 8. In this stroke section no rotation has been experienced for the shutter disk 1, because the transfer of the drive between the connecting rod small end 4 and the shutter arm 11 takes place through the link 12. If, in the stroke section which is necessary to clear the spoke ends 7 from the inclines 8 the connecting rod small end 4 is compelled to travel along an arc of circle having its center on the pin 13 of the link 12, no shift of the center 13 is experienced so that the arm 11 of the shutter disk is not rotated. As a result, the shutter 1 remains at standstill during such first portion of the stroke.

As the connecting rod small end 4, however, continues to be lifted in the arc shaped guideways 14, the rotation of the shutter is experienced, while the rotation of the spoked wheel does not take place at all.

Thus, by properly guiding the connecting rod small end 4 which is connected to the ram 15 of the servo-mechanisms, it becomes possible to carry out two rotations about mutually perpendicular axes (that is, the shaft 2 of the shutter and the axis of rotation of the spoked wheel 6) and have a great force available for securing the tight seal.

What we claim is:

1. A gate adapted particularly for sealing off large cross sections, comprising
   a housing having a valve seat and wedge members spaced about said seat,
   a valve disk having a shaft operatively connected to said housing which pivotally connects said disk to said housing between the open and closed positions about an axis of rotation parallel to the plane of said disk,
   said disk includes a pressure wheel on the side of said disk facing away from said seat, said pressure wheel being adapted to rotate about on axis of rotation which is perpendicular to the plane of said disk, and including radially projecting spokes which engage said wedge members after said disk is moved to its closed position against said seat and said wheel is rotated in one direction to produce a pressing force for a tight valve seal, and which disengage from said members when said wheel is rotated in the opposite direction before said disk is moved to its open position away from said seat, and a device which, by translational motion, rotates said disk between its open and closed positions in one plane and rotates said pressure wheel between its engagement and disengagement positions in a perpendicular plane, wherein said drive includes an arc shaped guideway connected to said housing, a rod movably positioned within said guideway, a ram connected to said rod which itself moves in a translational direction and which moves said rod within said guideway, a first pin connected to said rod and the outer end of one of said projecting spokes of said wheel for engaging and disengaging said spokes with said wedge members without rotation of said disk when said ram moves said rod in a portion of said guideway, a link connected at one end to said rod, a second pin connected at the other end of said link, and an arm connected to said second pin and said disk, wherein through, said link, second pin and arm, said ram moves said rod in another portion of said guideway to open and close said disk without rotation of said wheel.

2. The gate valve of claim 1, including cup springs connected between said pressure wheel and the side of said disk opposite its valve seal, wherein said cup springs are compressed when said spokes of said wheel engage said wedge member so as to discharge the reactive force onto said disk and valve seal to thereby issue a tight valve seal.

3. The gate valve of claim 2 including a servomotor which is connected to, and drives, said ram.

* * * * *

UNITED STATES PATENT AND TRADEMARK OFFICE
CERTIFICATE OF CORRECTION

PATENT NO. : 4,071,221
DATED : January 31, 1978
INVENTOR(S) : Nicola Di Sciascio and Michele Vinci It is certified that error appears in the above-identified patent and that said Letters Patent are hereby corrected as shown below:

Column 1, line 29, correct "because in time" to read

-- because, in time, --;

line 39, correct " $10^{-3} - 10^{-4}$ " to read

-- $10^{-3} \div 10^{-4}$ --.

Signed and Sealed this

Twentieth Day of June 1978

[SEAL]

Attest:

RUTH C. MASON
Attesting Officer

DONALD W. BANNER
Commissioner of Patents and Trademarks